(No Model.)

F. I. MAULE.
PUMPING ATTACHMENT FOR BARRELS.

No. 244,276. Patented July 12, 1881.

WITNESSES:
James F. Tobin,
Harry Smith

INVENTOR:
Francis I. Maule
by his Attorneys
Howson and Sons

N. PETERS, Photo-Lithographer, Washington, D. C.

UNITED STATES PATENT OFFICE.

FRANCIS I. MAULE, OF PHILADELPHIA, PENNSYLVANIA.

PUMPING ATTACHMENT FOR BARRELS.

SPECIFICATION forming part of Letters Patent No. 244,276, dated July 12, 1881.

Application filed May 27, 1881. (No model.)

*To all whom it may concern:*

Be it known that I, FRANCIS I. MAULE, of Philadelphia, Pennsylvania, and a citizen of the United States, have invented certain Improvements in Pumping Attachments for Barrels, of which the following is a specification.

The object of my invention is to provide the top of a barrel with a casing having a lid and inclosing a pump, by which the contents of the barrel may be raised into any vessel placed within the casing, means being furnished for locking the lid so that unauthorized persons cannot gain access to the pump.

Figure 1:
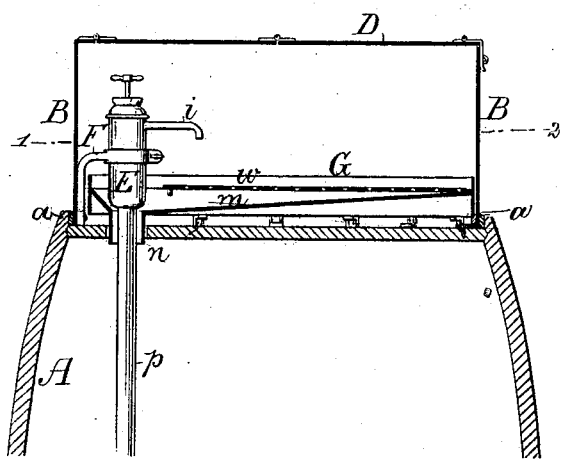
Figure 2:
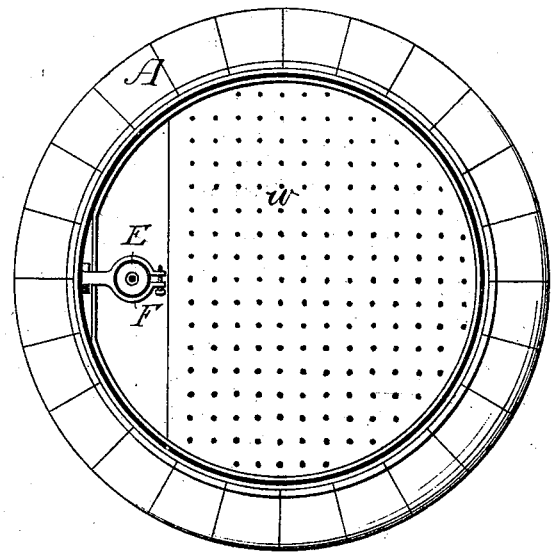
Figure 3:
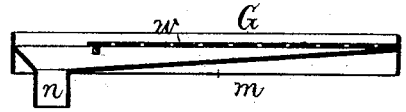

In the accompanying drawings, Figure 1 is a vertical section of the upper portion of a barrel illustrating my invention; Fig. 2, a sectional plan on the line 1 2; Fig. 3, a detached view of the tray; and Figs. 4 and 5, detached views drawn to an enlarged scale, and showing modes of fastening the casing to the top of the barrel.

Figure 4:
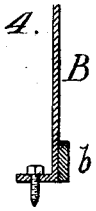
Figure 5:

A is the upper portion of a barrel, and B a casing, preferably of sheet metal, and of cylindrical form, so as to fit within the flange or chine $a$ of the barrel, suitable provision being made for properly securing the casing. For this purpose internally-projecting flanges or lugs on the casing may be used for receiving screws, as shown in Fig. 4; or pointed screws may be passed horizontally through the casing and through a strengthening-band, $b$, encircling the same into the chine $a$ of the barrel, as shown in Fig. 5.

The casing B is provided at the top with a lid, D, which can be raised, so as to expose the interior, or closed and locked, so as to prevent unauthorized persons from gaining access to the space within the casing.

The barrel E of a pump is secured to the interior of the casing A by means of a clamping-bracket, F, or other appropriate attachment. A tray, G, is placed within the casing, and this tray has a bottom, $m$, inclined downward to a tubular outlet, $n$, which passes through an opening in the barrel, the said opening being larger in diameter than the suction-pipe $p$, which extends from the barrel of the pump through the outlet and nearly to the bottom of the barrel. Above the bottom of the tray is a perforated partition or screen, $w$, for supporting the measuring-vessels, or for receiving a vessel into which liquid has to be pumped directly from the barrel, any liquid which may escape over the tops of the vessels or may drip from the spout $i$ of the pump passing through the perforations of the partition and onto the inclined bottom of the tray, whence it is returned through the outlet $n$ to the barrel.

The pump, tray, and inclosing-casing form a neat and convenient structure, which can be readily applied to or removed from the head of the barrel, the use of the attachment preventing waste and keeping the various parts, as well as the measuring-vessels, free from dust or insects, as well as from being handled or tampered with by meddling persons.

I claim as my invention—

1. The combination of a pump, E, adapted to an opening in the head of a barrel, with an inclosing-casing, B, adapted to fit within the chine of the barrel, and secured thereto, all substantially as set forth.

2. The combination of the barrel A, having an opening in the head, the casing B, adapted to fit within the chine of the barrel, the tray G, fitted to but detachable from the casing, and having the tray $w$ and tubular projection $n$, the pump E, and the clamp F, all substantially as set forth.

In testimony whereof I have signed my name to this specification in the presence of two subscribing witnesses.

FRANCIS I. MAULE.

Witnesses:
ARMER F. MCCORMICK,
HARRY SMITH.